United States Patent
Xu et al.

(10) Patent No.: US 12,008,828 B2
(45) Date of Patent: Jun. 11, 2024

(54) RECEIPT IDENTIFICATION METHOD, APPARATUS, ELECTRONIC DEVICE AND COMPUTER-READABLE STORAGE MEDIUM

(71) Applicant: Hangzhou Glority Software Limited, Hangzhou (CN)

(72) Inventors: Qingsong Xu, Hangzhou (CN); Qing Li, Hangzhou (CN)

(73) Assignee: Hangzhou Glority Software Limited, Hangzhou (CN)

( * ) Notice: Subject to any disclaimer, the term of this patent is extended or adjusted under 35 U.S.C. 154(b) by 381 days.

(21) Appl. No.: 17/485,511

(22) Filed: Sep. 27, 2021

(65) Prior Publication Data

US 2022/0012488 A1    Jan. 13, 2022

Related U.S. Application Data (63) Continuation-in-part of application No. PCT/CN2019/103848, filed on Aug. 30, 2019.

(30) Foreign Application Priority Data

May 9, 2019  (CN) .......................... 201910386149.0

(51) Int. Cl.
*G06K 9/00*  (2022.01)
*G06F 16/953*  (2019.01)
(Continued)

(52) U.S. Cl.
CPC ............ *G06V 30/40* (2022.01); *G06F 16/953* (2019.01); *G06V 20/62* (2022.01); *G06V 30/153* (2022.01);
(Continued)

(58) Field of Classification Search
CPC ...................................................... G06F 16/93
See application file for complete search history.

(56) References Cited

U.S. PATENT DOCUMENTS

| | | | | |
|---|---|---|---|---|
| 2007/0237427 A1* | 10/2007 | Patel | ...................... | G06V 30/40 |
| | | | | 382/305 |
| 2014/0064618 A1* | 3/2014 | Janssen, Jr. | .......... | G06V 30/416 |
| | | | | 382/182 |
| 2016/0358400 A1 | 12/2016 | Arikawa | | |

FOREIGN PATENT DOCUMENTS

| | | |
|---|---|---|
| CN | 102737239 | 10/2012 |
| CN | 104573735 | 4/2015 |

(Continued)

OTHER PUBLICATIONS

"International Search Report (Form PCT/ISA/210)" of PCT/CN2019/103848, with English translation thereof, mailed on Feb. 12, 2020, pp. 1-5.

(Continued)

*Primary Examiner* — Hadi Akhavannik (74) *Attorney, Agent, or Firm* — JCIP GLOBAL INC.

(57) ABSTRACT

The disclosure provides a receipt identification method, apparatus, electronic device and computer-readable storage medium. The method includes: obtaining (S101) an image of the receipt to be identified; identifying (S102) each row region of the receipt in the image by using a region identification model, wherein the row region is the region where each line of characters is located; identifying (S103) the character content in each row region by using the character identification model; determining (S104) time information, store name and payment amount on the receipt according to the character contents in each row region. The solution provided by the disclosure can automatically identify the relevant information on the receipt.

16 Claims, 6 Drawing Sheets

(51) Int. Cl.
*G06V 20/62* (2022.01)
*G06V 30/148* (2022.01)
*G06V 30/40* (2022.01)
*G06V 30/413* (2022.01)
*G06V 30/414* (2022.01)
*G06V 30/416* (2022.01)
*G06V 30/418* (2022.01)

(52) U.S. Cl.
CPC .......... *G06V 30/413* (2022.01); *G06V 30/414* (2022.01); *G06V 30/416* (2022.01); *G06V 30/418* (2022.01)

(56) References Cited

FOREIGN PATENT DOCUMENTS

| | | |
|---|---|---|
| CN | 104915114 | 9/2015 |
| CN | 107424000 | 12/2017 |
| CN | 107798299 | 3/2018 |
| CN | 107808154 | 3/2018 |
| CN | 108564035 | 9/2018 |
| CN | 109241857 | 1/2019 |
| CN | 109284750 | 1/2019 |
| CN | 109491623 | 3/2019 |
| CN | 109711402 | 5/2019 |
| JP | 2012226402 | 11/2012 |
| WO | 2017134904 | 8/2017 |

OTHER PUBLICATIONS

"Written Opinion of the International Searching Authority (Form PCT/ISA/237)" of PCT/CN2019/103848, mailed on Feb. 12, 2020, pp. 1-4.
"Office Action of China Counterpart Application", issued on Jun. 29, 2021, p. 1-p. 11.
"Notice of allowance of China Counterpart Application", issued on Dec. 3, 2021, p. 1-p. 4.

* cited by examiner

FIG. 1

Hudson News — A2

LOGAN INT'L AIRPORT
300 TERMINAL C
EAST BOSTON, MA 02128

STORE: 010    REG: 001 CASHIER: Wu
COCA-COLA CLASSIC 20oz
  49000000443      1 @ 2.49          2.54 N
  Container Deposit .05    .05

```
SUBTOTAL                              2.54
TOTAL                                 2.54    — A3
AMOUNT TENDERED
Cash                                 10.00

TOTAL PAYMENT                        10.00
CHANGE                                7 46
```
Transaction: 39              8/8/2017  6:52 AM
                                      — A1

We accept returns (except for
magazines and newspapers) for exchange
or refund within 14 days of original
purchase date when accompanied by the
sales receipt and in original
packaging and original condition Comments\Inquiries? (800)326-77
or Email commen @hudson
Thank You for shopping with us.

CUSTOMER RECEIPT

| | | | |
|---|---|---|---|
| Date: 26/12/2017 — D1 | | Time: | 20:09 |
| Tariff | : | | EvePk |
| Flag Fall | : | AED | 5.00 |
| Distance Charge | : | AED | 33.50 |
| Time Charge | : | AED | 18.50 |
| Water | : | AED | 0.00 |
| Extras | : | AED | 0.00 |
| Tollways | : | AED | 4.00 |
| Total Amount | : | AED | 61.00 — D3 |
| Type of Payment | : | Cash | |

Car no.  : XA007     Driver ID: 2160746
Pickup   : Al Raffa 1
Dropoff  : Uptown SC Booking No :

For Taxi Bookings

Tel No: 04 2080808
Fax No: 04 2080800
Email: dispatch@dtc.gov.ae

Call Center 800 90 90

Thank you for using our services
Website: www.dtc.gov.ae

RECEIPT IDENTIFICATION METHOD, APPARATUS, ELECTRONIC DEVICE AND COMPUTER-READABLE STORAGE MEDIUM

CROSS-REFERENCE TO RELATED APPLICATION

This is a continuation-in-part application of International Application No. PCT/CN2019/103848, filed on Aug. 30, 2019, which claims the priority benefits of China Application No. 201910386149.0, filed on May 9, 2019. The entirety of each of the above-mentioned patent applications is hereby incorporated by reference herein and made a part of this specification.

BACKGROUND

Field of the Disclosure

The disclosure relates to the field of image processing technology, and particularly to a receipt identification method, a receipt identification apparatus, an electronic device, and a computer-readable storage medium.

Description of Related Art

With the continuous development of the economy, people's consumption levels continue to improve. In order to protect consumers' rights, receipts have become a proof and effective reimbursement documents for consumers. Therefore, financial personnel need to process a large number of receipts every day to obtain information on receipts, such as ticketing time, ticketing store, payment amount, etc. In addition, there is an increasing number of people who utilize accounting classification statistics to keep a record of their own spending habits. Currently, people usually keep accounts by manually recording relevant information on receipts. Therefore, how to automatically identify the relevant information on the receipt is very important for financial personnel and individuals who keep accounting classification statistics.

SUMMARY OF THE DISCLOSURE

The purpose of the disclosure is to provide a receipt identification method, a receipt identification apparatus, an electronic device, and a computer-readable storage medium to automatically identify relevant information on the receipt. The specific technical solutions are as follows.

In the first aspect, the disclosure provides a receipt identification method, which includes:

obtaining an image of a receipt to be identified;

identifying each row region in the image by using a region identification model, wherein the row region is the region where each line of characters on the receipt is located, and the region identification model is a model based on a neural network;

identifying a character content in each row region by using a character identification model, wherein the character identification model is a model based on the neural network; and determining time information, store name and payment amount on the receipt according to the character content in each row region;

wherein the step of determining the payment amount on the receipt according to the character content in each row region includes:

determining at least one row region where the character content containing at least one preset keyword is located as the total amount region; and determining the payment amount on the receipt according to the character content in the total amount region.

Optionally, when identifying each row region in the image, the method further includes: identifying a time region by using the region identification model, and labeling the time region, wherein the time region is a row region that conforms to a preset time feature;

the step of determining the time information on the receipt according to the character content in each row region includes:

determining the time information on the receipt according to the character content of the time region.

Optionally, the step of determining the store name on the receipt according to the character content of each row region includes:

conducting a search in a store name database according to the character content of each row region to determine the store name on the receipt.

Optionally, when the receipt includes a pattern, the method further includes:

identifying a region where the pattern in the image is located by using the region identification model;

determining whether there is a matched store name pattern in a store name database according to the pattern; if there is the matched store name pattern in the store name database, determining a store name corresponding to the matched store name pattern as the store name on the receipt, if there is no matched store name pattern in the store name database, identifying the characters in the pattern, and using the characters identified in the pattern as the store name on the receipt; if there are no characters in the pattern, conducting a search in the store name database according to the character content of each row region to determine the store name on the receipt; and wherein each store name pattern in the store name database is labeled with a corresponding store name.

Optionally, the step of determining the store name on the receipt according to the character content of each row region includes:

conducting the search in the store name database based on the character content of each row region, if the store name on the receipt is not obtained, determining a store address based on the character content of each row region, and using the store address as the store name on the receipt.

Optionally, the step of determining the store address based on the character content of each row region includes:

if a preset character used to indicate an address appears in a certain row region, using the character following the preset character as the store address; and/or, if characters corresponding to the administrative region name or street name appear in a row region, using these characters as the store address;

the step of using the store address as the store name on the receipt includes:

selecting the address information that represents the smaller region in the store address as the store name.

Optionally, the step of determining the payment amount on the receipt according to the character content in the total amount region includes:

formulating all the preset key phrases in the total amount region into phrases to be queried, and selecting the target amount determining rule corresponding to the phrases to be queried from a rule database; wherein, there are phrases composed of different preset key phrases and the rule for determining the amount corresponding to each of phrases in the rule database;

determining the payment amount on the receipt based on the character content of the total amount region according to the target amount determining rule.

Optionally, the rule for determining the amount stored in the rule database is: designating a preset keyword in the phrase, so as to use the amount value corresponding to the preset keyword in the total amount region as the payment amount on the receipt;

the step of determining the payment amount on the receipt based on the character content of the total amount region according to the target amount determining rule includes:

using the amount value corresponding to the preset keyword specified by the target amount determining rule in the total amount region as the payment amount on the receipt.

Optionally, the step of formulating all the preset key phrases in the total amount region into the phrases to be queried includes:

formulating all the preset keywords in the total amount region into the phrase to be queried by an initial alphabetical order.

In the second aspect, the disclosure further provides a receipt identification apparatus, the receipt identification apparatus includes:

an acquisition module configured to obtain an image of a receipt to be identified;

a first identification module configured to identify each row region in the image by using a region identification model, wherein the row region is the region where each line of characters on the receipt is located, and the region identification model is a model based on a neural network;

a second identification module configured to identify the character content in each row region by using a character identification model, wherein the character identification model is a model based on a neural network; and a determining module configured to determine the time information, store name, and payment amount on the receipt according to the character content of each row region;

the step in which the determining module determines the payment amount on the receipt according to the character content in each row region includes:

determining at least one row region where the character content containing at least one preset keyword is located as the total amount region; and determining the payment amount on the receipt according to the character content in the total amount region.

Optionally, the first identification module is further configured to identify a time region by using the region identification model when identifying each row region on the receipt in the image, and label the time region, wherein the time region is a row region that conforms to a preset time feature;

the step in which the determining module determines the time information on the receipt according to the character contents in each row region includes:

determining the time information on the receipt according to the character content of the time region.

Optionally, the step in which the determining module determines the store name on the receipt according to the character content of each row region includes:

conducting a search in a store name database according to the character content of each row region to determine the store name on the receipt.

Optionally, when the receipt includes a pattern, the first identification module is further configured to identify the region where the pattern in the image is located by using the region identification model;

the determining module is further configured to determine whether there is a matched store name pattern in the store name database according to the pattern; if there is the matched store name pattern in the store name database, the determining module is configured to determine the store name corresponding to the matched store name pattern as the store name on the receipt, if there is no matched store name pattern in the store name database, the determining module is configured to identify the characters in the pattern, and use the identified characters in the pattern as the store name on the receipt; if there are no characters in the pattern, the determining module is configured to conduct a search in the store name database according to the character content of each row region to determine the store name on the receipt;

wherein each store name pattern in the store name database is labeled with a corresponding store name.

Optionally, the step in which the determining module determines the store name on the receipt according to the character content of each row region includes: conducting a search in the store name database based on the character content of each row region, if the store name on the receipt is not obtained, determining the store address based on the character content of each row region, and using the store address as the store name on the receipt.

Optionally, the step in which the determining module determines the store address based on the character content of each row region includes:

if a preset character used to indicate an address appears in a certain row region, using the character following the preset character as the store address; and/or, if characters corresponding to the administrative region name or street name appear in a row region, using these characters as the store address;

the step in which the determining module uses the store address as the store name on the receipt includes:

selecting the address information that represents the smaller region in the store address as the store name.

Optionally, the step in which the determining module determines the payment amount on the receipt according to the character content in the total amount region includes:

formulating all the preset key phrases in the total amount region into phrases to be queried, and selecting the target amount determining rule corresponding to the phrases to be queried from a rule database; wherein, there are phrases composed of different preset key phrases and the rules for determining the amount corresponding to various phrases in the rule database;

determining the payment amount on the receipt based on the character content of the total amount region according to the target amount determining rule.

Optionally, the rule for determining the amount stored in the rule database is: designating a preset keyword in the phrase, so as to use the amount value corresponding to the preset keyword in the total amount region as the payment amount on the receipt;

the step in which the determining module determines the payment amount on the receipt based on the character content in the total amount region according to the target amount determining rule includes:

using the amount value corresponding to the preset keyword specified by the target amount determining rule in the total amount region as the payment amount on the receipt.

Optionally, the step in which the determining module formulates all the preset key phrases in the total amount region into phrases to be queried includes:

formulating all the preset keywords in the total amount region into the phrase to be queried by an initial alphabetical order.

In the aspect of a third party, the disclosure further provides an electronic device, including a processor, a communication interface, a memory, and a communication bus, wherein the processor, the communication interface, and the memory completes the communication between each other through the communication bus;

the memory is configured to store computer programs;

the processor is configured to implement the steps of the receipt identification method described in the first aspect when executing the computer program stored in the memory.

In a fourth aspect, the disclosure further provides a non-transitory computer-readable storage medium in which a computer program is stored. When the computer program is executed by a processor, the steps of the receipt identification method described in the first aspect are implemented.

Compared with the current technologies, after obtaining the image of the receipt to be identified, the disclosure first uses the region identification model to identify each row region, then uses the character identification model to identify the character content in each row region, and finally determines the time information, store name, and payment amount in the receipt based on the character content, thereby realizing the automatic identification and display of relevant information on the receipt, which improves the efficiency of receipt processing. Further, the total amount region is determined by searching for the preset keywords in the character content to determine the payment amount on the receipt, thereby improving the accuracy and efficiency of identification of the payment amount.

BRIEF DESCRIPTION OF THE DRAWINGS

In order to explain the technical solutions of the embodiments of the present disclosure more clearly, the drawings of the embodiments will be briefly introduced below. Clearly, the drawings in the following description only relate to some embodiments of the present disclosure, rather than limit the present disclosure.

DESCRIPTION OF EMBODIMENTS

Hereinafter, a receipt identification method, a receipt identification apparatus, an electronic device, and a computer-readable storage medium provided by the disclosure will be further described in detail with reference to the accompanying drawings and specific embodiments. According to the claims and the following description, the advantages and features of the disclosure will be clearer. It should be noted that all the drawings are illustrated in a very simplified form with imprecise proportions, which are only used to conveniently and clearly assist in explaining the purpose of the embodiments of the disclosure.

In order to solve the problems of the current technologies, embodiments of the disclosure provide a receipt identification method, a receipt identification apparatus, an electronic device, and a computer-readable storage medium.

It should be noted that a receipt identification method in the embodiment of the disclosure can be applied to a receipt identification apparatus in the embodiment of the disclosure, and the receipt identification apparatus can be configured on an electronic device. Specifically, the electronic device may be a personal computer, a mobile terminal, etc., and the mobile terminal may be a hardware device with various operating systems, such as a mobile phone or a tablet computer.

Figure 1:
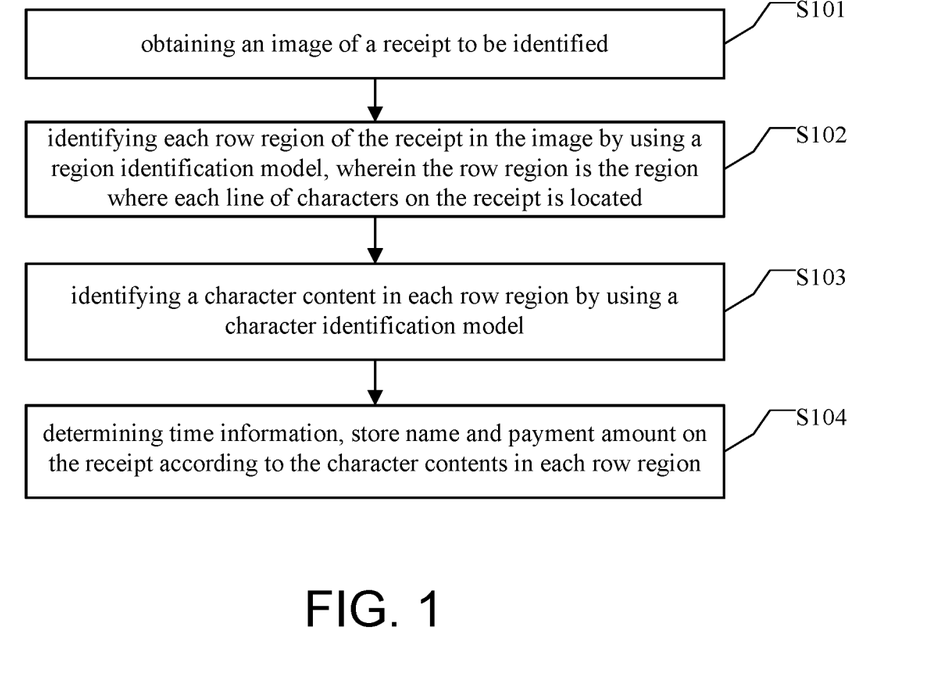
FIG. 1 is a schematic flowchart of a receipt identification method according to an embodiment of the disclosure.

FIG. 1 is a schematic flowchart of a receipt identification method according to an embodiment of the disclosure. Please refer to FIG. 1, a receipt identification method can include the following steps.

In step S101, an image of the receipt to be identified is obtained.

The receipt described in this embodiment can be invoices, bills, tax bills, receipts, shopping lists, catering receipts, insurance policies, reimbursement forms, express orders, itineraries, tickets, and other documents containing payment amount. The language of characters on the receipt can be Chinese, English, Japanese, Korean, German, etc., which should not be construed as a limitation to the disclosure.

In step S102, each row region of the receipt in the image is identified by using a region identification model, wherein the row region is the region where each line of characters is located.

The region identification module may be a neural network model obtained by pre-training. The image of receipt is input into the region identification model, and the region identification model can identify the region where each line of characters in the receipt is located, and label each identified row region.

In step S103, the character content in each row region is identified by using the character identification model.

The character identification module may be a neural network model obtained by pre-training. After each row region is identified, the receipt image labeled with various row regions can be input into the character identification model, or each row region is directly sliced and the sliced image is input into the character identification model. The character content in each row region is identified by using the character identification model.

The characters in the receipt can be the characters in a printed font or a handwritten font. Since there are differences in the character set corresponding to printed fonts and handwritten fonts, if the same character model is used to identify printed fonts and handwritten fonts, the accuracy of character identification will be reduced. Therefore, in order to improve the accuracy of character identification, different character identification models are adopted for different fonts. The character identification model can include an identification model for printed fonts and an identification model for handwritten fonts. The identification model for printed fonts and the identification model for handwritten fonts are trained separately. For handwritten fonts and printed fonts, different character training sets can be adopted to train the corresponding character identification models.

In step S104, the time information, store name, and payment amount on the receipt are determined according to the character content of each row region.

Specifically, the payment amount can be determined in the following manner: at least one row region containing at least one preset keyword in the character content is determined as the total amount region; and the payment amount on the receipt is determined according to the character content in the total amount region.

The preset keyword is used to indicate the project name of each payment project in the payment region. For example, the keyword can include: "subtotal", "total", "cash", "change", "discount", etc., and the keywords in the international receipt can include: "subtotal", "total", "ttl", "tax", "gratuity", "cash", "change", "discount", "service", "payment", "visa", etc. Based on the character content of each row region, the row region containing the preset keyword can be found, and all the row regions containing the preset keyword are determined as the total amount region, so as to find the value of the amount corresponding to the preset keyword from the character content in the total amount region, and then determine the payment amount on the receipt.

Specifically, the step of determining the payment amount on the receipt according to the character content of the total amount region may include: formulating all the preset key phrases in the total amount region into phrases to be queried, selecting the target amount determining rule corresponding to the phrases to be queried from a rule database, wherein there are phrases composed of different preset key phrases and the rules for determining the amount corresponding to various phrases in the rule database; and determining the payment amount on the receipt based on the character content of the total amount region according to the target amount determining rule.

All the preset keywords in the total amount region are arranged and combined to obtain the phrase to be queried. For example, the preset keywords may be arranged and combined according to the initial alphabetical order of the preset keywords. For example, the preset keywords contained in one receipt are "subtotal", "tax", and "total", and the phrase to be queried is subtotal-tax-total after the preset keywords are arranged and combined in an initial alphabetical order. The preset keywords contained in another receipt are "subtotal", "tax", "total", and "visa", and the phrase to be queried is subtotal-tax-total-visa after the preset keywords are arranged and combined in an initial alphabetical order. In receipts with Chinese characters, the phrase to be queried may be composed according to arrangement and combination of the initial alphabet of the Chinese pinyin abbreviation of the preset keywords. For example, the preset keywords are "小计 (which is translated as "subtotal" in English)", "税 (which is translated as "tax" in English)", and "总计 (which is translated as "total" in English)", and the phrase to be queried that can be obtained is "税-小计-总计 (which is translated as "tax-subtotal-total" in English)" according to arrangement and combination of the initial alphabet of the Chinese pinyin abbreviation of the preset keywords.

In this embodiment, the amount determining rule stored in the rule database may be: designating a preset keyword in the phrase, so as to use the amount value corresponding to the preset keyword in the total amount region as the payment amount on the receipt. Therefore, the step of determining the payment amount on the receipt based on the character content in the total amount region according to the target amount determining rule is specifically: using the amount value corresponding to the preset keyword specified by the target amount determining rule in the total amount region as the payment amount on the receipt.

For example, a phrase in the rule database is subtotal-tax-total, and the corresponding amount determining rule is set to select the amount value corresponding to the preset keyword "total" as the payment amount. Then, if the phrase to be queried is also subtotal-tax-total, the target amount determining rule is to select the amount value corresponding to the preset keyword "total" as the payment amount. Therefore, the amount value corresponding to the preset keyword "total" in the total amount region is used as the payment amount. In another example, a phrase in the rule database is subtotal-tax-total-visa, and the corresponding amount determining rule is set to select the amount value corresponding to the preset keyword "visa" as the payment amount. Then, if the phrase to be queried is also subtotal-tax-total-visa, the target amount determining rule is to select the amount value corresponding to the preset keyword "visa" as the payment amount. Therefore, the amount value corresponding to the preset keyword "visa" in the total amount region is used as the payment amount.

The following table exemplarily shows some phrases and their corresponding amount determining rules.

| phrases | amount determining rules |
|---|---|
| gratuity-purchase-total | total |
| cash-total | cash |
| credit card-total | credit card |
| credit-fuel total | credit |
| subtotal-tax-total-visa | visa |
| balance due-cash-change | balance due |
| purchase-total aud | total aud |
| amount usd | amount usd |
| subtotal usd-tip usd-total usd | total usd |
| tip-total | total |
| cashless-change-subtotal-take out total-tax-transaction amount | transaction amount |
| amount due inc gst-amount tendered c card-total parking fee | amount tendered c card |

Next, the method of determining time information and store name is described below.

Regarding time information, typically the time information is displayed on the receipt in a certain time format, that is, the time information conforms to certain time feature, such as the feature with date and slash, the feature with date and English character, and so on. For example, the time information displayed on receipt can be: "30 Jan' 18", "02/10/17", "22/11/2017", "Apr 06' 18", "Apr. 4, 2018", "2018-02-02", "26 Oct. 2017", "Nov. 18. 2017", "Mar. 24, 2018", "01012017", etc.

Therefore, the region that conforms to the preset time feature can be found from the row region, that is, the region (time region) where the time information is located, and then the time information of the receipt can be determined. Specifically, the region that conforms to the preset time feature in the row region is identified through the neural network model. The neural network model is established through pre-training, and the training samples are time pictures in various formats. The specific method is as follows: First, in the process of identifying each row region of the receipt in the image in step S102, the step further includes: identifying a time region by using the region identification model, and labeling the time region, wherein the time region is a row region that conforms to the preset time feature. Further, in step S104, the step of determining the time information of the receipt according to the character content of each row region includes: determining the time information of the receipt according to the character content in the time region. For example, if the character in the time region is "2018-02-02", it can be determined that the time information of receipt is "Feb. 2, 2018".

The store name can be determined in the following manner: conducting a search in a store name database according to the character content of each row region to determine the store name on the receipt. Various store names are pre-stored in the store name database, and the search is conducted in the store name database for the character content in each row region one by one. If the character content in a certain row region can be found in the store name database, the store name found in the store name database is used as the store name on the receipt. If the character content cannot be found through the search, the store address can be determined based on the character content of each row region, and the store address can be used as the store name on the receipt.

In this embodiment, the store address can be determined in the following ways: 1. if there are preset characters such as "地址 (which is translated as "address" in English)", "address", "add.", etc. for indicating the address in a row region, it can be determined that the characters following these preset characters are address information; 2. if there are characters corresponding to the administrative region name or street name number, these characters are determined as address information.

The store address is determined as the store name. The address information in the store address used to indicate a smaller region may be selected as the store name. For example, the street+number or building+floor room number information in the store address may be selected as the store name. The address information for indicating a smaller region can be the address information indicating the smallest region or the second smallest region among the administrative region name, and such information is typically the characters in the last part of the Chinese address or the first part of the English address. For example, if the store address information includes No. 10 Nanjing East Road, "No. 10 Nanjing East Road" is selected as the store name. If the store address information includes Raffles Plaza 302, "Raffles Plaza 302" is selected as the store name. If the store address information contains "store 601 XX mall", "store 601 XX mall" is selected as the store name. The address information in the store address information for indicating a larger region is not included in the store name, so as to keep the store name short. For example, if the store address information includes "No. 10, Nanjing East Road, Huangpu District, Shanghai", then "Huangpu District, Shanghai" is ignored, and only "No. 10, Nanjing East Road" is selected as the store name, so that the store name can be simplified.

In addition, when the receipt includes a pattern (usually a logo), the store name can be determined by the pattern, and the specific method is as follows:

identifying the region where the pattern in the image is located by using the region identification model;

determining whether there is a matched store name pattern in the store name database according to the pattern; if there is the matched store name pattern in the store name database, determining the store name corresponding to the matched store name pattern as the store name on the receipt, if there is no matched store name pattern in the store name database, identifying the characters in the pattern as the store name on the receipt; if there are no characters in the pattern, performing the step of conducting a search again in the store name database according to the character content of each row region to determine the store name on the receipt, wherein each store name pattern in the store name database is labeled with a corresponding store name.

That is, in the embodiment of the disclosure, if there is a matched store name pattern in the store name database, the store name corresponding to the matched store name pattern is determined as the store name on the receipt, and the store name on the receipt determined based on the character content in each row region is discarded. If there is no matched store name pattern in the store name database, but the characters in the pattern can be identified, then the identified characters in the pattern are used as the store name on the receipt. Similarly, the store name on the receipt determined based on the character content in each row region is discarded. If there is no matched store name pattern in the store name database, and there is no character in the pattern or the characters in the pattern are not identified, a search is conducted in the store name database according to the character content of each row region to determine the store name on the receipt, which can further improve the reliability of identification on store name.

Furthermore, if the store name cannot be found in the store name database based on the pattern, and there are no characters in the pattern, and the store name cannot be found in the store name database based on the character content of each row region, it is also possible to determine the store address based on the character content of each row region, and the store address is used as the store name on the receipt.

The method described in this embodiment is explained below with some specific examples of receipt.

Figure 2A:
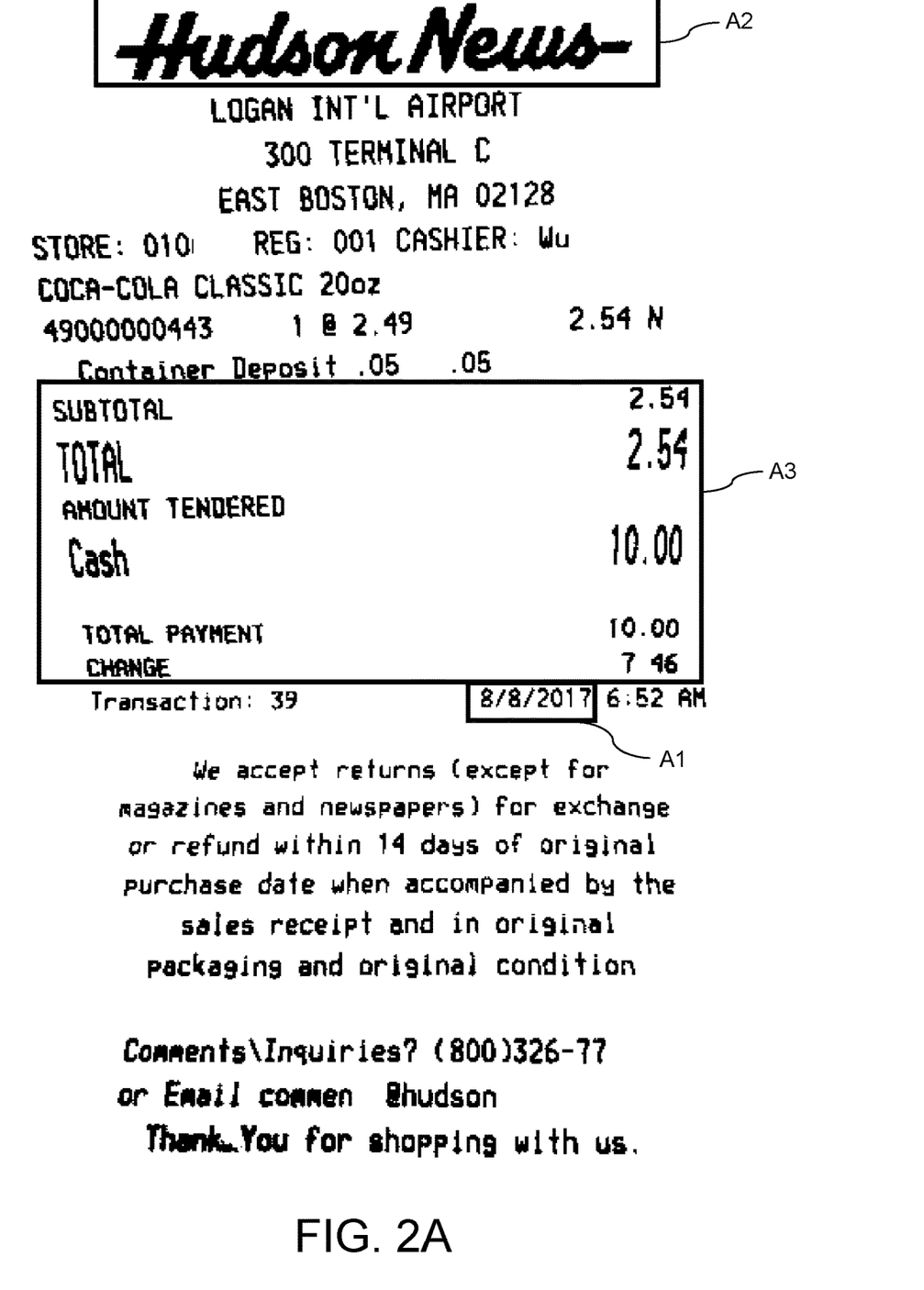
FIG. 2A to FIG. 2D are specific examples of receipts embodied in an embodiment of the disclosure.

In the receipt shown in FIG. 2A, the region identification model can identify the time region A1 in the process of identifying each row region, and then it can be determined that the time information is 8/8/2017 according to the identification result of the character identification model. In the meantime, the receipt includes a pattern, and the region identification model can further identify the region A2 where the pattern is located, and search for the matched store name pattern in the store name database according to the pattern, so as to determine the store name on the receipt. If there is no matched store name pattern in the store name database, the character identification model is adopted to identify the character "Hudson News" in the pattern as the store name. Based on the character identification result of each row region, it can be determined that the receipt contains the preset keywords "subtotal", "total", "cash", and "change". The row region A3 where these keywords are located is determined as the total amount region, and these key phrases are formulated into the phrase to be queried, namely "cash-change-subtotal-total". An amount determining rule corresponding to the phrase to be queried is searched in the rule database. If the found amount determining rule is to use the amount value corresponding to the keyword "total" as the payment amount, the amount value 2.54 corresponding to the keyword "total" in the total amount region A3 is used as the payment amount.

Figure 2B:
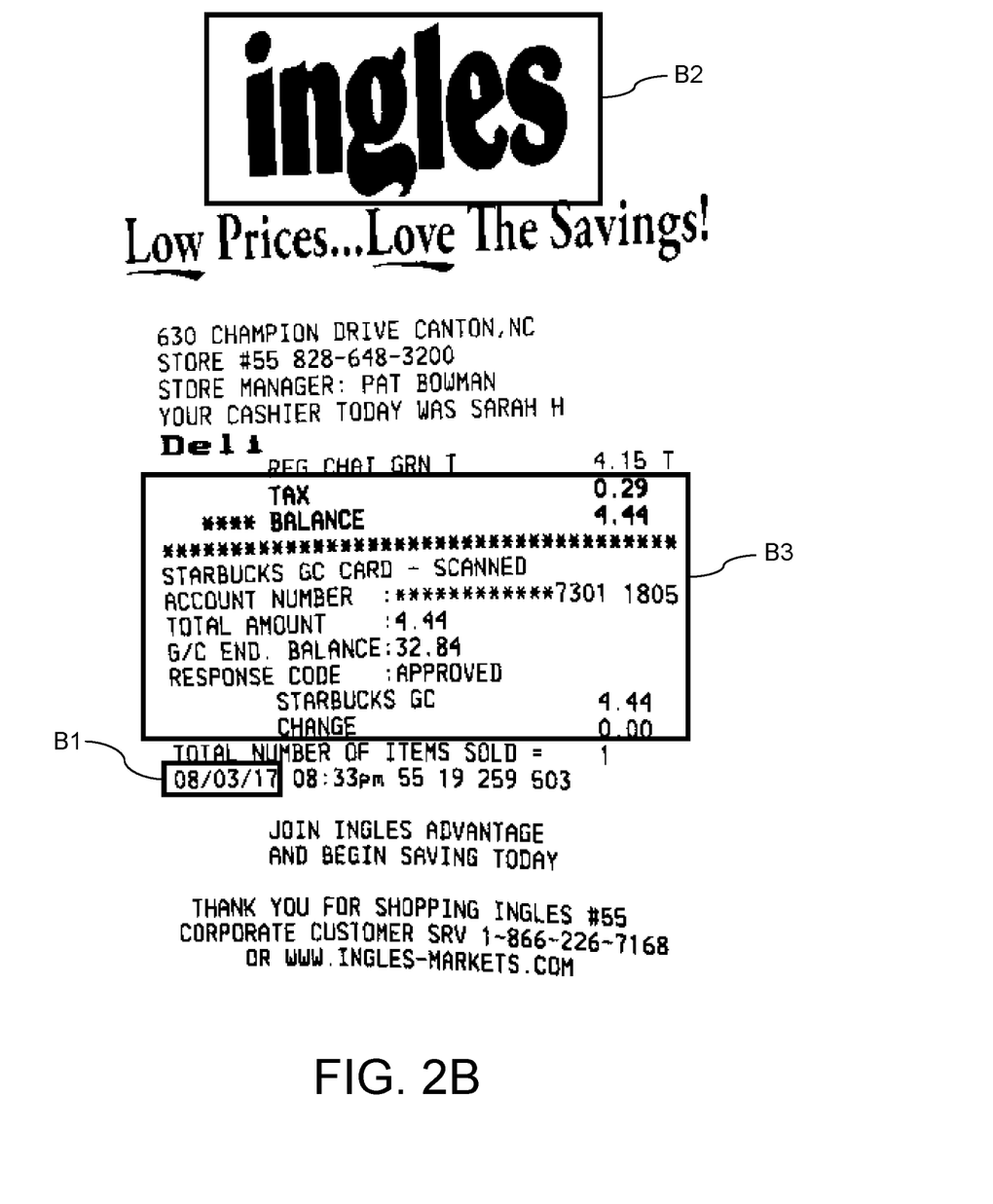

In the receipt shown in FIG. 2B, the region identification model can identify the time region B1 in the process of identifying each row region, and then it can be determined that the time information is 08/03/17 according to the identification result of the character identification model. In the meantime, the receipt includes a pattern, and the region identification model can further identify the region B2 where the pattern is located, and search for the matched store name pattern in the store name database according to the pattern, so as to determine the store name on the receipt. If there is no matched store name pattern in the store name database, the character identification model is adopted to identify the character "ingles" in the pattern as the store name. Based on the character identification result of each row region, it can be determined that the receipt contains the preset keywords "TAX", "BALANCE", "TOTAL AMOUNT", and "CHANGE". The row region B3 where these keywords are located is determined as the total amount region, and these key phrases are formulated into the phrase to be queried, namely "BALANCE-CHANGE-TAX-TOTAL AMOUNT". An amount determining rule corresponding to the phrase to be queried is searched in the rule database. If the found amount determining rule is to use the amount value corresponding to the keyword "TOTAL AMOUNT" as the payment amount, the amount value 4.44 corresponding to the keyword "TOTAL AMOUNT" in the total amount region B3 is used as the payment amount.

Figure 2C:
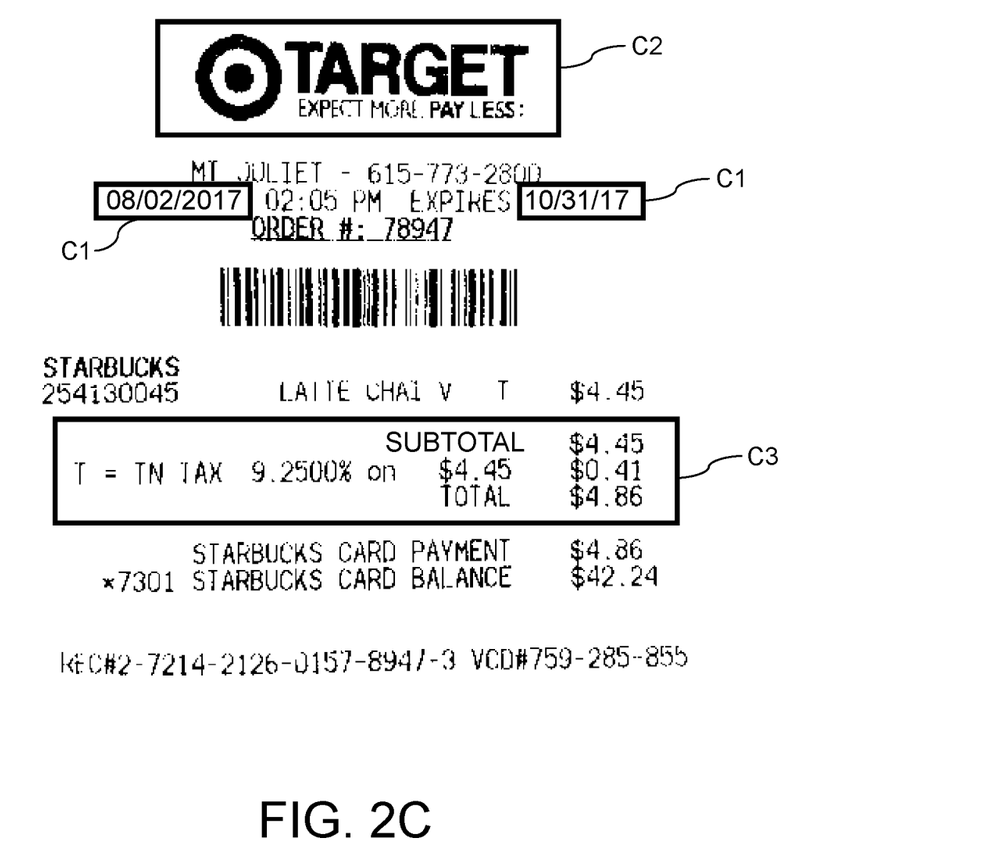

In the receipt shown in FIG. 2C, the region identification model can identify the time region C1 in the process of identifying each row region, and then it can be determined that the time information is 08/02/17 and 10/31/17 according to the identification result of the character identification model. In the meantime, the receipt includes a pattern, and the region identification model can further identify the region C2 where the pattern is located, and search for the matched store name pattern in the store name database according to the pattern, so as to determine the store name on the receipt. If there is no matched store name pattern in the store name database, the character identification model is adopted to identify the character "TARGET" in the pattern as the store name. Based on the character identification result of each row region, it can be determined that the receipt contains the preset keywords "SUBTOTAL", "TAX", and "TOTAL". The row region C3 where these keywords are located is determined as the total amount region, and these key phrases are formulated into the phrase to be queried, namely "SUBTOTAL-TAX-TOTAL". An amount determining rule corresponding to the phrase to be queried is searched in the rule database. If the found amount determining rule is to use the amount value corresponding to the keyword "TOTAL" as the payment amount, the amount value 4.86 corresponding to the keyword "TOTAL" in the total amount region C3 is used as the payment amount.

Figure 2D:
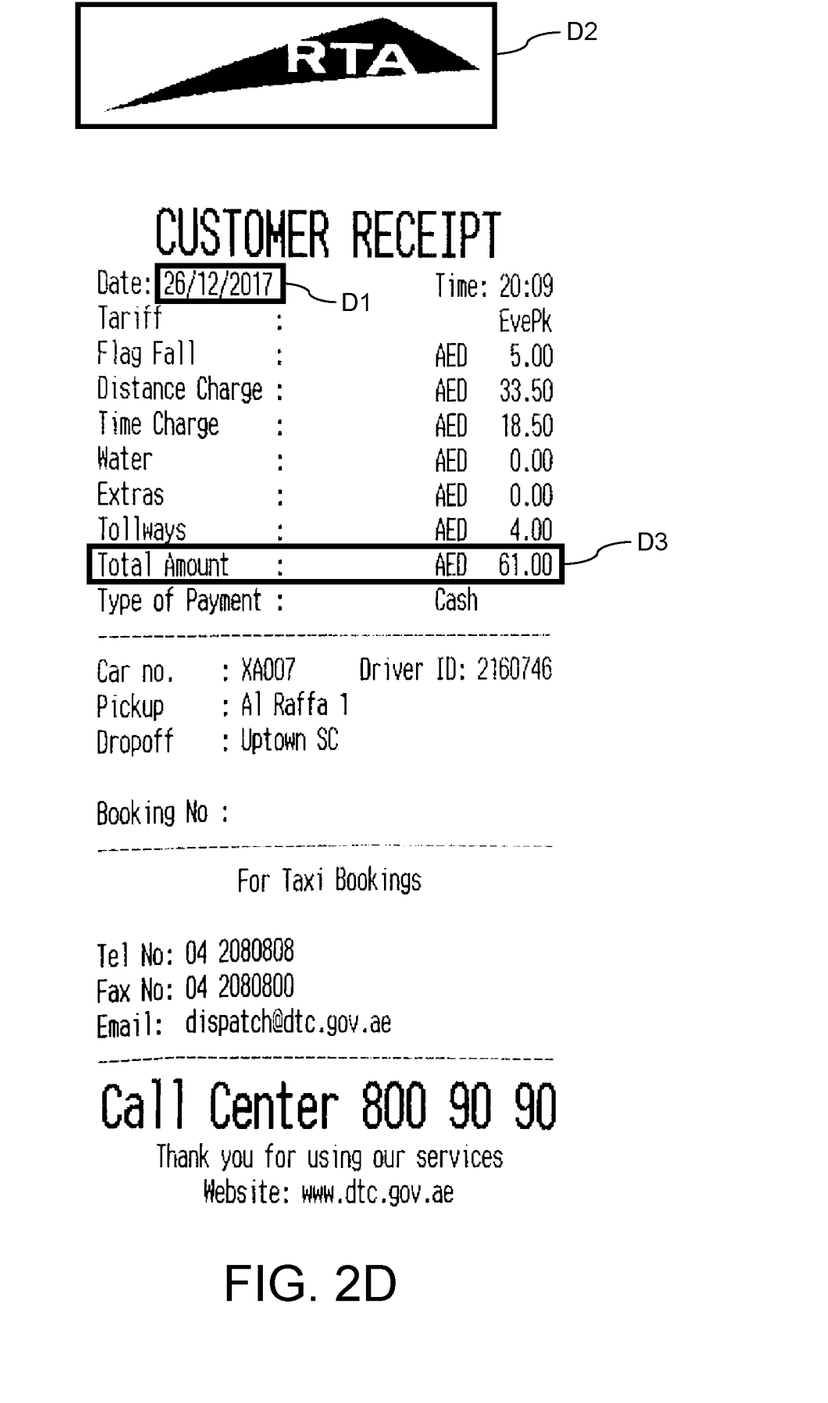

In the receipt shown in FIG. 2D, the region identification model can identify the time region D1 in the process of identifying each row region, and then it can be determined that the time information is 26/12/2017 according to the identification result of the character identification model. In the meantime, the receipt includes a pattern, and the region identification model can further identify the region D2 where the pattern is located, and search for the matched store name pattern in the store name database according to the pattern, so as to determine the store name on the receipt. If there is no matched store name pattern in the store name database, the character identification model is adopted to identify the character "RTA" in the pattern as the store name. Based on the character identification result of each row region, it can be determined that the receipt contains a preset keyword "Total Amount". The row region D3 where the keyword is located is determined as the total amount region, and the key phrase is formed into the phrase to be queried, namely "Total Amount". An amount determining rule corresponding to the phrase to be queried is searched in the rule database. If the found amount determining rule is to use the amount value corresponding to the keyword "Total Amount" as the payment amount, the amount value 61.00 corresponding to the keyword "Total Amount" in the total amount region D3 is used as the payment amount.

The training process of the region identification model and the character identification model will be briefly described below.

The region identification model can be obtained through the following process: labeling each receipt image sample in the receipt image sample set to label each row region in each receipt image sample; training the neural network through the labeled receipt image sample set to obtain the region identification model. When labeling each row region, it is possible to further label the region that conforms to the preset time feature as the time region. In this way, the region identification model that is trained through a large number of various types of time region samples can identify each row region while identifying and labeling the time region.

The character identification model can be obtained through the following process: labeling each row region that is labeled in the training process of the region identification model to label the characters in each row region; training the neural network through each row region that is labeled to obtain the character identification model.

Certainly, the training set of the character identification model may be different from the training set of the region identification model, the disclosure provides no limitation thereto.

To sum up, in this embodiment, after obtaining the image of the receipt to be identified, the region identification model is first used to identify each row region, and then the character identification model is used to identify the character content in each row region, and finally the time information, store name, and payment amount in the receipt are determined based on the character content, thereby realizing the automatic identification and display of relevant information on the receipt, which improves the efficiency of processing receipts.

Figure 3:
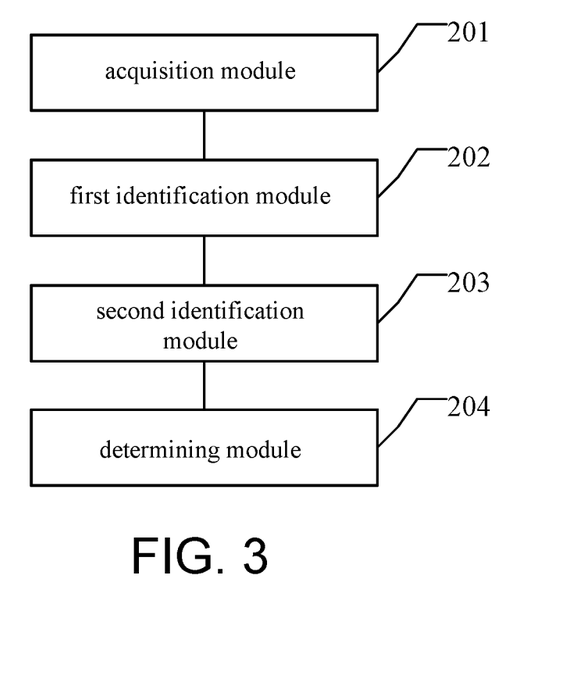
FIG. 3 is a schematic structural diagram of a receipt identification apparatus embodied in an embodiment of the disclosure.

Corresponding to the foregoing method embodiment, an embodiment of the disclosure further provides a receipt identification apparatus. FIG. 3 is a schematic structural diagram of a receipt identification apparatus embodied in an embodiment of the disclosure. Please refer to FIG. 3. A receipt identification apparatus can include:

an acquisition module 201 configured to obtain an image of a receipt to be identified;

a first identification module 202 configured to identify each row region of the receipt in the image by using a region identification model, wherein the row region is the region where each line of characters on the receipt is located;

a second identification module 203 configured to identify the character content in each row region by using a character identification model; and a determining module 204 configured to determine the time information, store name, and payment amount on the receipt according to the character content of each row region.

Specifically, the step in which the determining module 204 determines the payment amount on the receipt according to the character contents in each row region includes:

determining at least one row region where the character content containing at least one preset keyword is located as the total amount region; and determining the payment amount on the receipt according to the character content in the total amount region.

Optionally, the first identification module 202 is further configured to identify a time region by using the region identification model when identifying each row region on the receipt in the image, and label the time region, wherein the time region is a row region that conforms to a preset time feature.

The step in which the determining module 204 determines the time information on the receipt according to the character contents in each row region is specifically as follows:

determining the time information on the receipt according to the character content of the time region.

Optionally, the step in which the determining module 204 determines the store name on the receipt according to the character content of each row region is specifically as follows:

conducting a search in a store name database according to the character content of each row region to determine the store name on the receipt.

Optionally, when the receipt includes a pattern, the first identification module 202 is further configured to identify the region where the pattern in the image is located by using the region identification model.

The determining module 204 is further configured to determine whether there is a matched store name pattern in the store name database according to the pattern; if there is the matched store name pattern in the store name database, the store name corresponding to the matched store name pattern is determined as the store name on the receipt, if there is no matched store name pattern in the store name database, the characters in the pattern are identified and used as the store name on the receipt; if there are no characters in the pattern, a search is conducted in the store name database again according to the character content of each row region to determine the store name on the receipt;

wherein each store name pattern in the store name database is labeled with a corresponding store name.

That is, in the embodiment of the disclosure, if there is a matched store name pattern in the store name database, the store name corresponding to the matched store name pattern is determined as the store name on the receipt, and the store name on the receipt determined based on the character content in each row region is discarded. If there is no matched store name pattern in the store name database, but the characters in the pattern can be identified, then the identified characters in the pattern are used as the store name on the receipt. Similarly, the store name on the receipt determined based on the character content in each row region is discarded. If there is no matched store name pattern in the store name database, and there is no character in the pattern or the characters in the pattern are not identified, a search is conducted in the store name database according to the character content of each row region to determine the store name on the receipt, which can further improve the reliability of identification on store name.

Optionally, the determining module 204 is further configured for searching in the store name database according to the character content of each row region. If the store name on the receipt cannot be determined, the store address is determined based on the character content in each row region, and the store address is used as the store name on the receipt.

Optionally, the step in which the determining module 204 determines the store address based on the character content of each row region is specifically as follows:

if a preset character used to indicate an address appears in a certain row region, the character following the preset character is used as the store address;

if characters corresponding to the administrative region name or street name appear in a row region, these characters are used as the store address.

The step in which the determining module 204 uses the store address as the store name on the receipt includes:

selecting the address information that represents the smaller region in the store addresses as the store name.

Optionally, the step in which the determining module 204 determines the payment amount on the receipt according to the character content in the total amount region includes:

formulating all the preset key phrases in the total amount region into phrases to be queried, and selecting the target amount determining rule corresponding to the phrases to be queried from a rule database; wherein, there are phrases composed of different preset key phrases and the rules for determining the amount corresponding to various phrases in the rule database;

determining the payment amount on the receipt based on the character content of the total amount region according to the target amount determining rule.

Optionally, the rule for determining the amount stored in the rule database is: designating a preset keyword in the phrase, so as to use the amount value corresponding to the preset keyword in the total amount region as the payment amount on the receipt.

The step in which the determining module 204 determines the payment amount on the receipt based on the character content in the total amount region according to the target amount determining rule is specifically as follows:

using the amount value corresponding to the preset keyword specified by the target amount determining rule in the total amount region as the payment amount on the receipt.

Optionally, the step in which the determining module 204 formulates all the preset key phrases in the total amount region into phrases to be queried is specifically as follows:

formulating all the preset keywords in the total amount region into the phrase to be queried by an initial alphabetical order.

Figure 4:
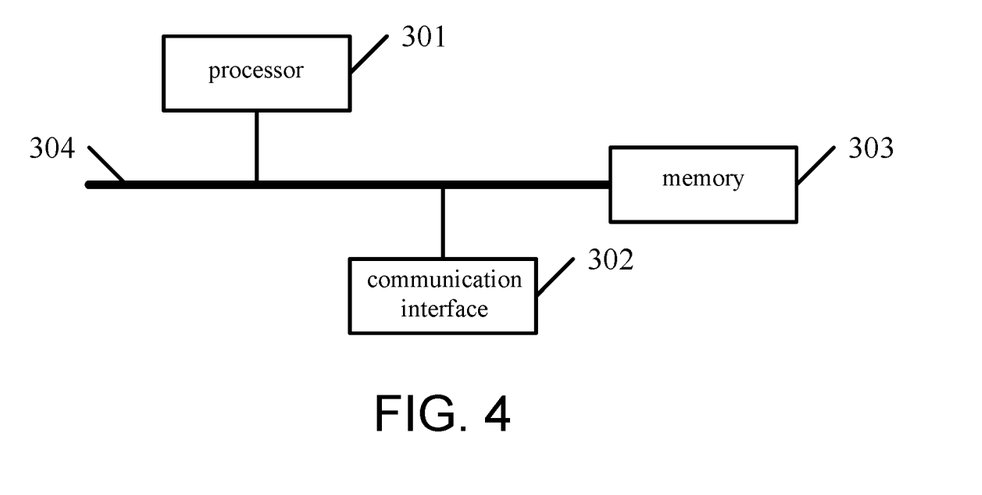
FIG. 4 is a schematic structural diagram of an electronic device embodied in an embodiment of the disclosure.

An embodiment of the disclosure further provides an electronic device. FIG. 4 is a schematic structural diagram of an electronic device embodied in an embodiment of the disclosure. Please refer to FIG. 4, the electronic device includes a processor 301, a communication interface 302, a memory 303, and a communication bus 304, wherein the processor 301, the communication interface 302, and the memory 303 completes the communication between each other through the communication bus 304.

The memory 303 is configured to store computer programs.

The processor 301 is configured to implement the following steps when executing the computer program stored in the memory 303:

obtaining an image of the receipt to be identified;

adopting a region identification model to identify each row region of the receipt in the image; wherein the row region is the region where each line of characters is located;

adopting a character identification model to identify the character content in each row region;

determining the time information, store name and payment amount on the receipt according to the character content of each row region;

wherein, the step of determining the payment amount on the receipt according to the character contents in each row region includes:

determining at least one row region where the character content containing at least one preset keyword is located as the total amount region; and determining the payment amount on the receipt according to the character content in the total amount region.

Please refer to the method embodiment shown in FIG. 1 above for the specific implementation of each step of the method and related content, and no further description will be incorporated herein.

In addition, other implementations of the receipt identification method implemented by the processor 301 executing the program stored in the memory 303 are the same as the implementations mentioned in the foregoing method embodiments, and no further description will be incorporated herein.

The communication bus mentioned in the description related to electronic device may be a Peripheral Component Interconnect (PCI) bus or an Extended Industry Standard Architecture (EISA) bus, etc. The communication bus can be categorized into address bus, data bus, control bus, etc. For ease of illustration, only a thick line is adopted in the figure to represent the communication bus, which does not mean that there is only one bus or only one type of bus.

The communication interface is configured to implement communication between the electronic device and other devices.

The memory may include random access memory (RAM), and may also include non-volatile memory (NVM), such as at least one disk memory. Optionally, the memory may also be at least one storage apparatus located far away from the processor described above.

The aforementioned processor can be a general-purpose processor, including a central processing unit (CPU), a network processor (NP), etc. The processor can also be a digital signal processing (DSP), a dedicated Application Specific Integrated Circuit (ASIC), a Field-Programmable Gate Array (FPGA) or other programmable logic devices, discrete gates or transistor logic devices, discrete hardware components.

An embodiment of the disclosure further provides a computer-readable storage medium in which a computer program is stored. When the computer program is executed by a processor, the steps of the above-mentioned receipt identification method are realized.

It should be noted that the various embodiments in this specification are described in a related manner, and the same or similar parts between the various embodiments can serve as cross-reference for each other. Each embodiment focuses on the differences from other embodiments. In particular, in the embodiments related to the apparatus, electronic device, and computer-readable storage medium, since they are basically similar to the method embodiments, the description is relatively simple. For related parts, please refer to the description of the method embodiments.

In this specification, relational terms such as first and second are only used to distinguish one entity or operation from another entity or operation, and do not necessarily require or imply that these entities or operations are in any actual relationship or order. Moreover, the terms "include", "contain" or any other alternatives thereof are intended to involve non-exclusive inclusion, so that a process, method, article or device including a series of elements not only includes those elements, but also includes other elements that are not explicitly listed, or also include elements inherent to this process, method, article or device. If there are no further limitations, the element defined by the sentence "including a . . . " does not exclude the existence of other identical elements in the process, method, article, or device that includes the element.

The foregoing description is only a description of the preferred embodiments of the disclosure and does not limit the scope of the disclosure in any way. Any changes or modifications made by persons of ordinary skill in the field of the disclosure based on the foregoing disclosure shall fall within the protection scope of the claims.

What is claimed is:

1. A receipt identification method, characterized in comprising:
    obtaining an image of a receipt to be identified;
    identifying each row region in the image by using a region identification model, wherein the row region is a region where each line of characters on the receipt is located, and the region identification model is a model based on a neural network;
    identifying a character content in each of the row regions by using a character identification model, wherein the character identification model is a model based on the neural network;
    determining time information, a store name and a payment amount on the receipt according to the character content in each of the row regions;
    wherein step of determining the payment amount on the receipt according to the character content in each of the row regions comprises:
        determining at least one of the row regions where the character content containing at least one preset keyword is located as a total amount region; and
        determining the payment amount on the receipt according to the character content in the total amount region,
    wherein step of determining the store name on the receipt according to the character content of each of the row regions comprises:
        conducting a search in a store name database according to the character content of each of the row regions to determine whether the store name of the receipt is obtained from the store name database; and
        if the store name on the receipt is not obtained from the store name database, determining a store address based on the character content of each of the row regions, and using the store address as the store name on the receipt.

2. The receipt identification method according to claim 1, wherein when identifying each of the row regions in the image, the method further comprises: identifying a time region by using the region identification model, and labeling the time region, wherein the time region is a row region that conforms to a preset time feature;
    step of determining the time information on the receipt according to the character content in each of the row regions comprises:
    determining the time information on the receipt according to the character content of the time region.

3. The receipt identification method according to claim 1, wherein when the receipt contains a pattern, the method further comprises:
    identifying a region where the pattern in the image is located by using the region identification model;
    determining whether there is a matched store name pattern in the store name database according to the pattern; if there is the matched store name pattern in the store name database, determining the store name corresponding to the matched store name pattern as the store name on the receipt, if there is no matched store name pattern in the store name database, identifying characters in the pattern, and using the characters identified in the pattern as the store name on the receipt; if there are no characters in the pattern, conducting the search in the store name database according to the character content of each of the row regions to determine the store name on the receipt;
    wherein each of the store name patterns in the store name database is labeled with a corresponding store name.

4. The receipt identification method according to claim 1, wherein step of determining the store address based on the character content of each of the row regions comprises at least one of followings:
   if a preset character used to indicate an address appears in one of the row regions, using a character following the preset character as the store address; and
   if characters corresponding to an administrative region name or a street name appear in one of the row regions, using the characters as the store address;
   step of using the store address as the store name on the receipt comprises:
   selecting address information that represents a smaller region in the store address as the store name.

5. The receipt identification method according to claim 1, wherein step of determining the payment amount on the receipt according to the character content in the total amount region comprises:
   formulating all preset key phrases in the total amount region into phrases to be queried, and selecting a target amount determining rule corresponding to the phrases to be queried from a rule database; wherein, there are phrases composed of different preset key phrases and a rule for determining an amount corresponding to each of the phrases in the rule database;
   determining the payment amount on the receipt based on the character content of the total amount region according to the target amount determining rule.

6. The receipt identification method according to claim 5, wherein the rule for determining the amount stored in the rule database is: designating one of the preset keywords in the phrase, and using an amount value corresponding to the preset keyword as the payment amount on the receipt;
   step of determining the payment amount on the receipt based on the character content of the total amount region according to the target amount determining rule comprises:
   using the amount value corresponding to the preset keyword specified by the target amount determining rule in the total amount region as the payment amount on the receipt.

7. The receipt identification method according to claim 5, wherein step of formulating all the preset key phrases in the total amount region into the phrases to be queried comprises:
   formulating all the preset keywords in the total amount region into the phrase to be queried by an initial alphabetical order.

8. A receipt identification apparatus, characterized in comprising:
   an acquisition module configured to obtain an image of a receipt to be identified;
   a first identification module configured to identify each row region in the image by using a region identification model, wherein the row region is a region where each line of characters on the receipt is located, and the region identification model is a model based on a neural network;
   a second identification module configured to identify a character content in each of the row regions by using a character identification model, wherein the character identification model is a model based on the neural network;
   a determining module configured to determine time information, a store name, and a payment amount on the receipt according to the character content of each of the row regions;

wherein the determining module determines the payment amount on the receipt according to the character content in each of the row regions comprising:
   determining at least one of the row regions where the character content containing at least one preset keyword is located as a total amount region; and
   determining the payment amount on the receipt according to the character content in the total amount region,
wherein the determining module determines the store name on the receipt according to the character content of each of the row regions comprises:
   conducting a search in a store name database according to the character content of each of the row regions to determine whether the store name of the receipt is obtained from the store name database; and
   if the store name on the receipt is not obtained from the store name database, determining a store address based on the character content of each of the row regions, and using the store address as the store name on the receipt.

9. The receipt identification apparatus according to claim 8, wherein the first identification module is further configured to identify a time region by using the region identification model when identifying each of the row regions on the receipt in the image, and label the time region, wherein the time region is a row region that conforms to a preset time feature;
   the determining module determines the time information on the receipt according to the character content in each of the row regions comprising:
   determining the time information on the receipt according to the character content of the time region.

10. The receipt identification apparatus according to claim 8, wherein when the receipt contains a pattern, the first identification module is further configured to identify a region where the pattern in the image is located by using the region identification model;
   the determining module is further configured to determine whether there is a matched store name pattern in the store name database according to the pattern; if there is the matched store name pattern in the store name database, the determining module is configured to determine the store name corresponding to the matched store name pattern as the store name on the receipt, if there is no matched store name pattern in the store name database, the determining module is configured to identify characters in the pattern, and use the characters identified in the pattern as the store name on the receipt; if there are no characters in the pattern, the determining module is configured to conduct the search in the store name database according to the character content of each of the row regions to determine the store name on the receipt;
   wherein each of the store name patterns in the store name database is labeled with a corresponding store name.

11. The receipt identification apparatus according to claim 8, wherein the determining module determines the store address based on the character content of each of the row regions comprising at least one of followings:
   if a preset character used to indicate an address appears in one of the row regions, using a character following the preset character as the store address; and
   if characters corresponding to an administrative region name or a street name appear in one of the row regions, using the characters as the store address;

wherein the determining module uses the store address as the store name on the receipt comprising:
selecting address information that represents a smaller region in the store address as the store name.

12. The receipt identification apparatus according to claim 8, wherein the determining module determines the payment amount on the receipt according to the character content in the total amount region comprising:
formulating all preset key phrases in the total amount region into phrases to be queried, and selecting a target amount determining rule corresponding to the phrases to be queried from a rule database; wherein, there are phrases composed of different preset key phrases and a rule for determining an amount corresponding to each of the phrases in the rule database;
determining the payment amount on the receipt based on the character content of the total amount region according to the target amount determining rule.

13. The receipt identification apparatus according to claim 12, wherein the rule for determining the amount stored in the rule database is: designating one of the preset keywords in the phrase, and using an amount value corresponding to the preset keyword as the payment amount on the receipt;
the determining module determines the payment amount on the receipt based on the character content of the total amount region according to the target amount determining rule comprising:
using the amount value corresponding to the preset keyword specified by the target amount determining rule in the total amount region as the payment amount on the receipt.

14. The receipt identification apparatus according to claim 12, wherein the determining module formulates all the preset key phrases in the total amount region into the phrases to be queried comprising:
formulating all the preset keywords in the total amount region into the phrase to be queried by an initial alphabetical order.

15. An electronic device, characterized in comprising: a processor, a communication interface, a memory, and a communication bus, wherein the processor, the communication interface, and the memory completes communication between each other through the communication bus;
wherein the memory is configured to store a computer program; and
the processor is configured to implement the steps in the method claimed in claim 1 when executing the computer program stored in the memory.

16. A non-transitory computer-readable storage medium, in which a computer program is stored, characterized in that when the computer program is executed by a processor, the steps in the method claimed in claim 1 are realized.

* * * * *